DEFLECTION CIRCUITS FOR CATHODE RAY TUBES

Original Filed March 2, 1959

2 Sheets-Sheet 1

INVENTOR.
RICHARD R. HOFFMAN
BY Leonard H. King

United States Patent Office 3,196,310
Patented July 20, 1965

3,196,310

DEFLECTION CIRCUITS FOR CATHODE RAY TUBES

Richard R. Hoffmann, Flushing, N.Y., assignor to Probescope Company, Port Washington, N.Y.

Original application Mar. 2, 1959, Ser. No. 796,607, now Patent No. 3,017,573, dated Jan. 16, 1962. Divided and this application Dec. 12, 1961, Ser. No. 168,864
4 Claims. (Cl. 315—29)

The present invention is directed generally to sweeping spectrum analyzers and in particular to sweep control circuits.

This application is a division of copending application Serial No. 796,607, filed March 2, 1959, now Patent No. 3,017,573.

It is desirable, in frequency scanning or frequency modulating devices, to be able to vary the width of the band of frequencies which is scanned by the device while maintaining constant its center frequency. In general frequency scanning in such devices is accomplished in response to a periodical varying signal the magnitude of the variation determining the scanned band width, while the center frequency of the frequency band under examination is controlled in response to a D.C. variable voltage. In one aspect of the present invention, there is provided a novel mixer circuit for combining the varying sweep width control voltage and the D.C. center frequency control voltage, each without interaction on the other. The invention finds particular utility in frequency scanning devices having a low scanning rate, and where the center frequency of the scan is required to remain fixed while the extent of scanning is being varied.

Since such scanning devices are commonly employed in frequency scanning panoramic receivers, also known as spectrum analyzers, the invention will be described as applied to such a device, without intending to limit the scope of the claims to any particular application.

Panoramic devices are employed to display visually the frequency content of a band of frequencies, i.e. the amplitude of each signal within the band plotted against a base line effectively calibrated in terms of frequency. A frequency scanning receiver is employed, in the more common types of panoramic devices, which scans over a frequency band under examination in response to a periodic scanning voltage wave applied to a voltage responsive tuner of frequency scanning device, included in the frequency scanning receiver. The extent of width of the band of frequencies which is scanned by the device is then a function of the peak-to-peak magnitude of the periodic scanning voltage, and means are provided for controlling and varying this magnitude in order to enable scan width control. The center frequency of the frequency band under examination is also subject to control, by applying a controllable D.C. voltage to the voltage responsive tuner or scanning device.

In order to provide a visual display of the frequency content of the band of frequencies, a cathode ray tube indicator is commonly employed. In such cases the ray of the indicator is usually swept in one coordinate direction in synchronism with the scanning voltage, to provide a base line calibratable in frequency, and is deflected in another coordinate direction in response to the signal output of the frequency scanning voltages. A plot of amplitude against frequency is thus generated on the face of the cathode ray tube.

In a preferred form of the invention, frequency scanning of the oscillator of a superheterodyne receiver is accomplished by varying a control voltage applied to a electronic control circuit. The control voltage is preferably of sawtooth form, and is coupled to the electronic control circuit by a cathode follower circuit. The sweepwidth of the scanned frequency spectrum is then determined by the maximum amplitude of the sawtooth scanning voltage, which may be varied by a voltage divider. In addition to the sweepwidth control circuit, there is provided a center frequency control circuit, for determining the center frequency of the frequency band through which the local oscillator is swept. The center frequency control circuit provides a D.C. voltage, which is applied to the reactance tube to determine its fixed bias voltage.

One feature of this invention is the provision of a mixing circuit for combining the center frequency and sweepwidth control voltages, the output of the mixing circuit being connected to a single control element of the electronic control circuit Miller tube or reactance tube, to control both the fixed voltage and the voltage variation applied thereto.

A problem arises in the use of spectrum analyzers in the low frequency portion of the spectrum say from 0 to 10,000 cycles where it is often necessary to resolve two signals which may be separated by only 2 cycles.

Resolution is a function of both sweep width and sweep rate. In general, if sweep width is increased, sweep rate must be decreased to maintain the same resolution. However, operationally it is desirable to employ a fast scan rate when a wide portion of the spectrum is being searched. Accordingly there is provided means for automatically increasing the scanning or sweep rate as the sweep width is increased and simultaneously automatically adjust the bandwidth of filter circuits to provide optimum resolution for any resulting combination of sweep width and sweep rate.

A further feature of this invention is the provision of means to permit varying of the sweep rate while maintaining constant a given resolution.

The present invention provides a sawtooth sweep generator circuit employing a series circuit comprising a A.C. voltage source, a resistor and a capacitor. The capacitor charges at an exponential rate and by employing a long time constant the charging curve is made quite linear in the beginning. A vacuum tube in parallel with the capacitor is employed as a switch to control the charge and discharge points of the capacitor. The discharge taking place through the vacuum tube. A novel circuit controls the operation of the switch tube so as to independently determine the charge and discharge points. This permits the independent determination of the "left and right" edges of the display on a cathode ray tube employing the sawtooth sweep as a time base generator. Further it permits selection of a portion of the charging curve of a desired linearity or non-linearity, if say an exponential sweep is desired.

These and still other features and advantages of the invention will be pointed out with particularity or will become obvious as the following description proceeds taken in conjunction with the accompanying drawings.

Figure 1:
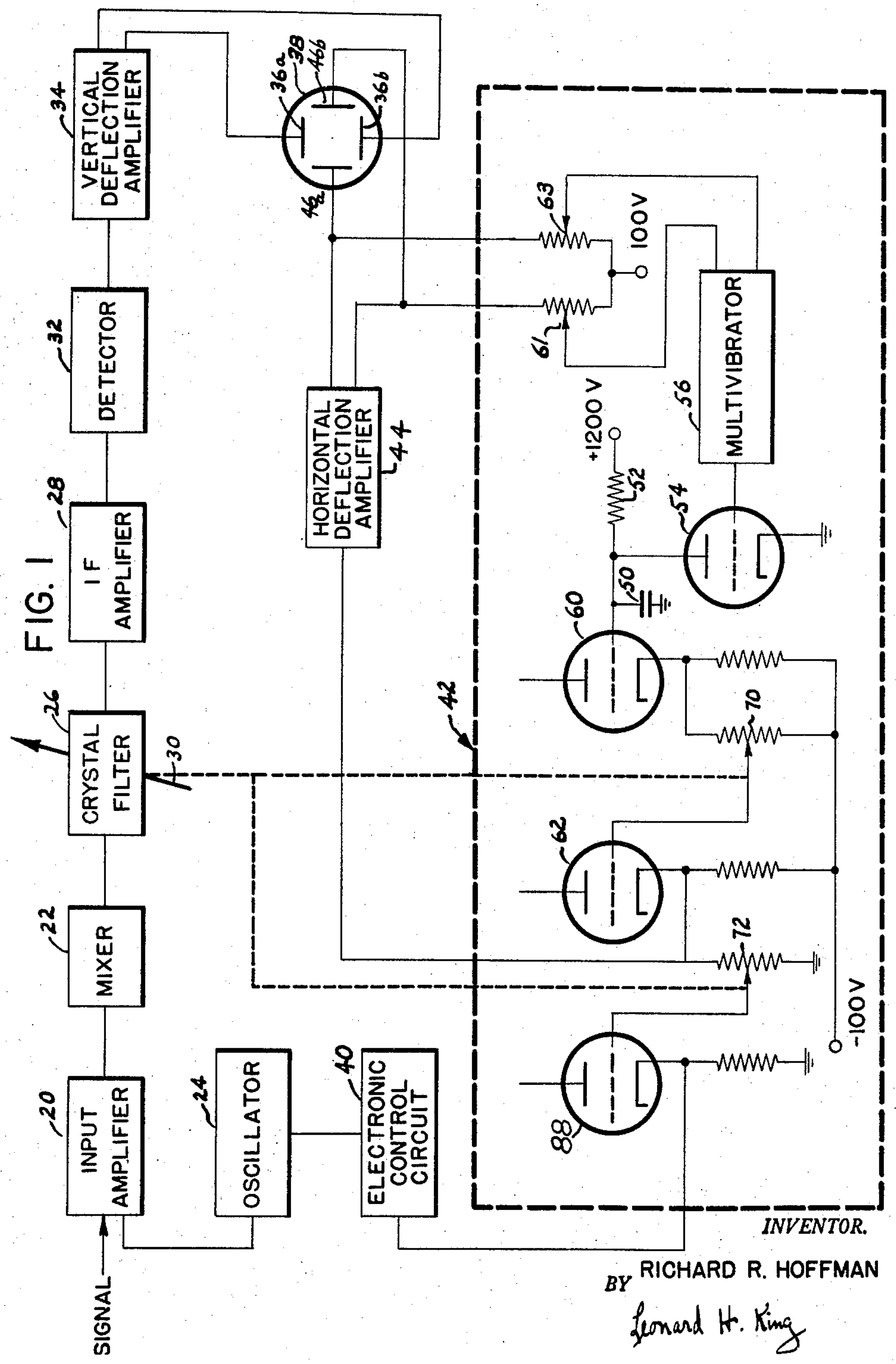
FIGURE 1 is a schematic diagram of a spectrum analyzer.

In FIGURE 1 there is shown in the form of a block diagram a spectrum analyzer employing the instant invention.

The signal to be analyzed is fed to an input amplifier 20 which may be arranged to amplify or attenuate the incoming signal to a desired level. The signal is then applied, usually through a cathode follower, to a balanced mixer stage 22. An oscillator signal from oscillator 24 is likewise applied to the mixer 22. The output of the mixer is fed to a conventional plate tank circuit, tuned to a desired intermediate frequency. Thus, only sidebands which approximate the intermediate frequency will appear at the output of the balanced mixer 22.

A crystal filter stage 26 is used to filter the signal to permit only a band of a given bandwidth to pass to intermediate amplifier 28.

The crystal filter is of a type permitting variation in the pass band width by varying of a control 30 (shown schematically).

A conventional means for varying the bandwidth is to employ a variable resistance, as control 30, in parallel with a tuned plate tank circuit and which acts in series with a crystal to vary the bandwidth of the crystal filter. Such crystal filter circuits and methods of varying bandwidth are well known to the art.

It is also conventional to employ a number of crystal filters in cascade to obtain the desired bandwidth.

It is necessary to maintain a particular relationship between bandwidth, sweep width, and sweep rate to maintain optimum resolution.

The signal of the desired frequency spectrum is then amplified by amplifier 28 and the signal detected in detector 32. The output of the detector is amplified in vertical deflection amplifier 34 and applied to the vertical deflection paltes *36a* and *36b* of cathode ray tube 38. Other display means such as recording devices, may be substituted for the cathode ray tube.

The oscillator 24 is electronically controlled by electronic control circuit 40. The oscillator may be, by way of example, of the Hartley type and the electronic control circuit may be a Miller Tube or reactance tube circuit.

A sweep generator 42 provides a sweep signal to the horizontal amplifier 44 which is amplified and applied to plates 46 of cathode ray tube 38.

The sweep generator also provides a signal to the electronic control circuit 40 to control the center frequency of the oscillator as well as the sweep range.

The foregoing description is typical of prior art spectrum analyzers.

The present invention differs in the unique features of the sweep generator which will be described hereinafter in greater detail.

In this circuit, a capacitor 50 is charged from a high potential source shown as a 1200 volt D.C. source through a resistance 52. The time constant is chosen to provide a long charging time relative to the sweep time of the horizontal sweep. For example by using a 25 $\mu$fd. capacitor 50 and a 1.5 megohm resistor 52 a time constant of 375 seconds is obtained. By employing a 30 second maximum sweep time, the circuit utilizes an extremely linear portion of the voltage curve as measured across the capacitor.

In the present embodiment, the design permits electronic control of a D.C. coupled saw-tooth generator whose period can be adjusted from 1 to 30 seconds.

Discharge of capacitor 50 is controlled by a switch which in this instance is a vacuum tube 54. The switch tube 54 is controlled by multivibrator 56. As will be discussed in detail hereinafter with reference to FIGURE 2 the capacitor voltage, appearing on the grid of a cathode follower amplifier 60 which is cascaded to amplifier 62 and in turn drives paraphase differential amplifier stage 44. The dual output of amplifier 44 is directly coupled to horizontal oscilloscope deflection plates 46. The output of the paraphase amplifier 44 is also applied to a pair of individual variable voltage dividers 61 and 63 connected to a negative source of voltage. The voltage dividers drive the grids of a dual triode cathode follower amplifier (not shown in the simplified showing of FIGURE 1) whose output provides positive control of the multivibrator.

One plate of this multivibrator operates the capacitor shorting switch tube 54 to complete the loop. Although the capacitor's charge attempts to reach the full 1200 volts, it never reaches this because the circuit is designed to limit the voltage build-up to well within the "linear" portion of the logarithmic charge rate curve. That is, the flip-flop circuit 56 causes the capacitor 50 to discharge after a maximum of 30 seconds of the 375 total RC time constants. If, for example, a 10 second sweep is desired, the output of amplifier 44 is maximized so that the paraphase amplifier output quickly reaches the level required to reverse the multivibrator.

In addition to driving the local loop, a second output from the "capacitor-amplifier," after further application by amplifier 60 controls the electronic control circuit 40, as for example the grid of a Miller tube which in turn controls a Hartley oscillator. The signal frequency may be divided as by Eccles-Jordan division and the intermediate frequency signal fed to a balanced modulator, also receiving a 0 to 5 kc. input. The latter is from the circuit under spectrum analysis. One of the mixer's output side bands passes through amplifying and crystal filter circuits 26 to a diode detector 32. The resulting envelope is applied to the vertical deflection plate of the oscilloscope. In this way, the spectrum of the test circuit is frequency swept once with each horizontal sweep of the scope. Ganged potentiometers 70, 72, and 30 simultaneously adjust the sweep rate and the sweep width for best search condition and automatically varies the bandwidth of the crystal filter to maintain optimum resolution for the particular sweep rate and sweep width. Thus, the operator may control his analysis incrementally from full time to a minimum time. This allows him to select portions of the frequency sweep which interest him most, reducing the overall time for the analysis. By ganging the sweep rate and sweep width control and filter band width, no calculations are needed to obtain optimum resolution for any particular sweep rate and sweep width. A conventional regulated power supply energizes the apparatus.

Figure 2:
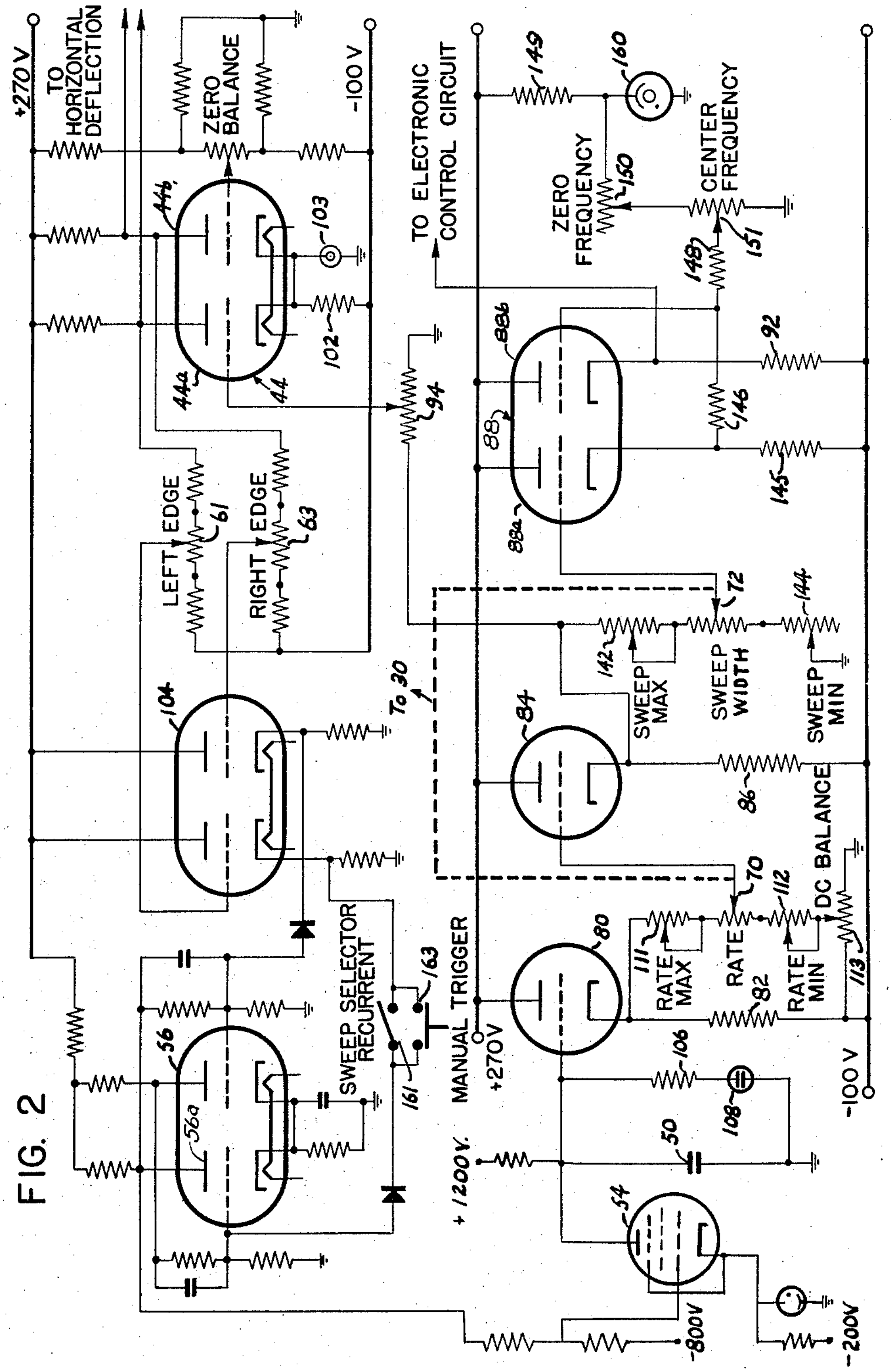
FIGURE 2 is a detailed circuit diagram of a portion of the apparatus shown in FIGURE 1.

Referring now to the schematic circuit of FIGURE 2 showing in detail the sweep generator circuit 42. Tube 54 acts as an on-off switch to control the discharge of capacitor 50. Tube 54 is connected in parallel with capacitor 50 to the grid of cathode follower amplifier 80. When switch tube 54 is non-conducting, capacitor 50 tends to charge up to 1200 volts through resistor 52 (time constant 375 seconds). Basically, the voltage appearing across cathode follower resistor 82 drives grid of tube 84 employing cathode resistor 86 across which an output signal is derived and fed to two circuits. One circuit includes dual amplifier 88 employing a cathode follower circuit which controls the voltage applied to the electronic control circuit 40, such as the grid of a Miller tube. This output is derived across cathode follower resistor 92. In turn circuit 40 controls the frequency swing of say a 200 to 300 kc. Hartley type oscillator 24. The potential derived across cathode follower resistor 86 is applied to potentiometer 94, which acts as a voltage divider serving as a sweep width multiplier, to the grid of tube *44a*. Dual tube 44 serves as a paraphase amplifier whose cathode resistor 102 provides an output voltage to a jack 103 providing means for coupling to an external display means. Tube sections *44a* and *44b* produce voltages 180 degrees out of phase with each other. A positive voltage on the grid of tube section *44a* causes a negative signal to appear on the plate of that tube section and a positive signal on the plate of tube section *44b*. These voltages are applied directly to the cathode ray tube horizontal deflection plates *46a* and *46b* and to individual voltage divider potentiometers 61 and 63. These voltage dividers are connected to a nominal −100 volts source, and potentiometer taps, slightly positive, drive the grids of dual tube 104. The decoupling cathode follower circuit of tube 104 controls the state of flip-flop multivibrator 56. Positively driven to each state, the multivibrator timing is determined by setting of the wipers of potentiometers 61 and 63. When the plate 56a of tube 56 goes negative, tube 54 cuts off, and capacitor 50 charges. When the state is reversed, tube 54 conducts discharging capacitor 50 producing a nearly vertical trace fly-back voltage. This voltage pulse, amplified and passed around the loop again, reverses the flip-flop 56 back to its original state, repeating the cycle. Maximum and minimum voltage excursions of capacitor are determined by potentiometers 61 and 63 respectively. Resistor 106 and neon lamp 108 shunting capacitor 50 limit the charge on capacitor 50. The cathode potential of tube 54 is brought to a negative potential (−100 volts) to permit complete discharge of capacitor 50 if desired. Cathode resistor 82 of tube 80 is shunted by a voltage divider comprising resistors 111, 112, 113, and 70. Resistor 113 is a D.C. balance control establishing identical voltage at resistor 112 and the cathode of tube 80. This balances out any D.C. voltages appearing in the output. Resistor 111 and resistor 112 establish maximum and minimum sweep duration. Resistor 70 may be employed as a "front panel" control accessible to the operator to provide in a typical installation from three to thirty seconds sweep rate variation. It is to be understood other time ranges may be employed if desired. Variable potentiometer resistor 72 (with maximum and minimum control variable resistors 142 and 144) acts as a voltage divider for the output from the cathode follower of tube 84. These resistors serve as the sweep width control circuits which drive the electronic control circuit 40. In one embodiment a sweep range determinable by a Miller tube of from 60 to 600 cycles was provided.

Potentiometer 94, which could be a step type variable resistor, serves as a sweep width multiplier. When the wiper is set at maximum, the full output from tube 84 appears at the grid of amplifier 44a. If the wiper is set, say, at the electrical center of the potentiometer, only half the output of tube 84 will appear on the grid of tube 44a.

Assume now that the circuit constants are such that with the wiper of potentiometer 94 is in the maximum position and the charge on capacitor 50 reaches 100 volts. Then the multivibrator 56 will cause tube 54 to conduct. It will be seen that if the wiper of potentiometer 94 is adjusted so as to apply half the output voltage from tube 84 then it will be necessary for the capacitor to charge to 200 volts in order to provide a sufficient voltage at the grid of tube 44a to cause tube 54 to be rendered conductive. Since the charging rate of the capacitor is constant, the effect of control potentiometer 94 is to provide means for changing the length or duration of the sweep. It is a particularly advantageous feature of this invention that for all settings of potentiometer 94, as the sweep time is changed the sweep width is also changed, so as to maintain constant the resolution but presenting on the display, more frequently, a smaller portion of the spectrum.

The sweep width is initially determined by the setting of control 72 which is ganged to sweep rate control 70 and bandwidth control 30. The voltage signal from control 72 is applied to the grid of tube 88a. Associated with amplifier 88a there is provided a cathode resistor 145 in the circuit of tube 88a. The center frequency of sweep oscillator 24 is determined by the voltages applied to the grid of tube 88b. The voltage to tube 88b is derived from a voltage divider comprising resistors 149, 150, and 151. Resistor 150 is a variable resistance and provides a zero frequency adjust means while resistor 151 is a potentiometer. The wiper of which is connected to isolation resistors 146 and 148. The grid of tube 88b is connected to a common junction of resistors 146 and 148. The output of tube 88b is derived across cathode resistor 92 and is applied to the electronic control circuit which as indicated may be a Miller tube. Gas tube 160 serves as a voltage stabilizer for the D.C. voltage applied to the grid of tube 88b.

When in the closed position switch 161 provides for recurrent operation of the sweep. When switch 161 is in open position, then switch 163 may be closed to manually trigger the circuit. The diodes, resistors and capacitors shown associated with tube 56 are part of a conventional multivibrator circuit.

The operation of this invention will now be described in conjunction with a spectrum analyzer designed to operate in the zero to five kilocycle spectrum range with a sweeping oscillator adapted to cover a 20 cycle to 600 cycle portion of the spectrum. As the signals are tuned in, they appear as vertical pips on the horizontal axis of the cathode ray tube. Their location, relative to a reference point, along the horizontal axis will indicate frequency, and the height of the pip will indicate amplitude. Change of center frequency and sweep deviation are obtained by means of calibrated tuning controls.

As the visual sweep width of a conventional prior art spectrum analyzer is increased, or decreased, the resolution on the screen of the receiver respectively becomes narrower or wider. Generally a wide band spectrum analyzer has less frequency resolution than a narrow band analyzer, and while the first one permits a more rapid survey of wide regions of the frequency spectrum, the second one permits more accurate survey when the signals are quite close to each other.

The optimum resolution obtainable between adjacent signals is a function of filter bandwidth, sweep-rate, and sweep width. These are design formulas known to the art for determining the relationship between the parameters to provide optimum resolution. Assuming now that the relationship between potentiometer controls 70, 72, and 30 affecting respectively the sweep-rate, sweep width and bandwidth of crystal filter 26 are so chosen that as the sweep width control is varied, the optimum resolution frequency will vary so that at a very small sweep width of say 20 cycles which corresponds to ±10 cycle and a sweep rate of 10 seconds. A fine resolution of 2 cycles is obtained. At this narrow bandwidth the fine resolution is an operational requirement. On the other hand, at a 200 cycle sweep width a resolution in the order of 22 cycles is adequate.

As the sweep width is increased to 200 cycles, the sweep rate may be increased to 1 second as a resolution of 22 cycles is adequate. The band width must also be adjusted to maintain optimum resolution for the chosen sweep rate and sweep width in accordance with the formula:

$$B<.9\sqrt{1.8(SW)(SR)} \qquad (1)$$

Where

B is the desired bandwidth in cycles,
SW is the sweep width in cycles, and
SR is the sweep rate in cycles/second It is to be noted that as the sweep width is increased the sweep rate is also increased since the resolution requirement is not as stringent at wide spectrum widths.

In operation, the operator searches for a signal by sweeping across the frequency spectrum to be studied using the widest sweep width available on the instrument. Upon detecting the presence of a signal, he then reduces the sweep width so as to be able to separate and analyze adjacent signals. As the operator varies control 72 to reduce the sweep width, he simultaneously varies control 70, which is ganged to control 72, thereby decreasing the sweep rate. The band width control 30 is likewise simultaneously varied so as to reduce the bandwidth to maintain optimum resolution for the particular values of sweep rate and sweep width. The operator having detected the signal and resolved it now desires to monitor the particular signal. However, in low frequency spectrum analysis the sweep times become extremely long and exceed the storage time of cathode ray tubes of normal persistence unless special storage type tubes are employed. Therefore, it is desirable to maintain the same resolution at a higher sweep rate. Resolution in cycles may be approximately determined by the formula:

$$R=(1.3\pm0.3)\sqrt{1.8(SW)(SR)} \qquad (2)$$

Where

R is resolution in cycles,
SW is sweep width in cycles, and
SR is sweep rate in cycles/second Reference to the formula will show that the resolution may be maintained if the sweep width is decreased and the sweep rate is increased in inverse ratio. It is to be noted that the mechanical ganging of controls 70, 72, and 39 does not maintain a fixed resolution and that if the sweep rate is increased the sweep width increases contrary to the requirements of Equation 2 for maintaining fixed resolution.

As the operator varies control 94, he increases the sweep rate and decreases the sweep width, thus, displaying a smaller portion of the spectrum in a shorter period of time while maintaining the same resolution. Another advantage of this shorter time period is that repeated displays of the signal under study is frequently made permitting the operator to detect non-repetitive or short duration signals.

Controls 61 and 63 permit the adjustment of the left and right edges of this display with respect to the center of the tubes independently of each other. An important advantage of this circuit is that by varying control 61 and 63, a linear portion of the charge curve of capacitor 50 may be selected.

Another important advantage of the disclosed circuit is that with changes in horizontal deflection the left and right edges of the display can be controlled independently. In a spectrum analyzer there is normally employed a calibrated screen in front of the tube face to permit the operator to directly interpret the frequency being observed. If tube aging occurs or other drifting of component values arise during use, the line size must be readjusted so as to match the calibrations on the screen. However, the apparatus of the present invention is not subject to this disadvantage since the left and right edges of the picture are determined by the operational voltages derived from the controls 61 and 63 and, therefore, the deflection voltage is not affected by minor change in component values.

The center frequency determining D.C. potential is independent of the A.C. signal derived from the cathode of tube 88*a*. It will be noted that the cathode resistors of tubes 80, 84, and 88 are returned to a —100 volts bus. D.C. balance control 113 provides means to balance out the D.C. potential with respect to ground.

Having thus disclosed the invention, what is claimed is:

1. In combination with a cathode ray tube having electron beam deflection means:
(a) a source of D.C. potential;
(b) a two-electrode capacitor having one electrode connected to a portion of said source of D.C. potential of one polarity;
(c) a resistor connected between the other said electrode of said capacitor and a portion of said source of D.C. potential of a second polarity;
(d) a vacuum tube having its plate-cathode circuit connected in parallel with said capacitor;
(e) on-off control means connected to said vacuum tube to control its plate-to-cathode conduction so as to control the discharge of the said capacitor;
(f) a paraphrase amplifier arranged to provide a pair of related output voltages to output means connected to the electron beam deflection means; and
(g) variable means for applying a selected portion of one of said output voltages to said on-off control means to place said control means in an "on" position when one of said related output voltages is of a first potential level and a variable means for applying a selected portion of the other of said related output voltages to said on-off control means to place said control means in an "off" position when said output is at a second potential level.

2. A controlled R.C. charging network, including a source of D.C. potential, a resistor connected to said source and a capacitor connected across said resistor and said source for charging said capacitor from said source through said resistor, and means to control the charging curve of said capacitor, said means comprising:
a vacuum tube having a control grid and a plate-cathode circuit in parallel with said capacitor;
a bistable means arranged to provide a blocking voltage to said grid whenever the charge on said capacitor reaches a first potential during a discharge cycle and to remove the blocking voltage so as to render said vacuum tube conductive thereby discharging said capacitor whenever the charge on said capacitor reaches a second potential during a charge cycle; and
means to independently adjust the response of said bistable means to desired values of first and second potential.

3. The apparatus of claim 2 wherein said bistable means is a multivibrator.

4. A controlled R.C. charging network, including a source of D.C. potential, a resistor connected to said source, and a capacitor connected across said resistor and said source for charging said capacitor from source through said resistor, and means to control the charging curve of said capacitor, said means comprising:
a vacuum tube having a control grid and a plate-cathode circuit in parallel with said capacitor;
a bistable means arranged to provide a blocking voltage to said grid whenever the charge on said capacitor reaches a first potential during a discharge cycle and to remove the blocking voltage so as to render said vacuum tube conductive thereby discharging capacitor whenever the charge on said capacitor reaches a second potential during a charge cycle; and
a pair of independently adjustable voltage sources, interposed in cascade between said bistable means and said capacitor, said sources being controlled by said capacitor charge so as to provide output voltages proportional at all times to the charge on said capacitor, one of said voltage sources being adjusted to trigger the bistable means so as to render the said vacuum tube nonconducting when said capacitor is discharged to a first potential and until it charges to a second potential and the other of said voltage sources being adjusted to trigger the bistable means so as to render said vacuum tube conductive when said capacitor becomes charged to the second potential and until it is discharged to the first potential.

References Cited by the Examiner

UNITED STATES PATENTS

| | | | |
|---|---|---|---|
| 2,363,822 | 11/44 | Wendt | 315—29 |
| 2,414,486 | 1/47 | Rieke | 315—29 X |
| 2,428,926 | 10/47 | Bliss | 315—29 X |
| 2,467,834 | 4/49 | Lasher | 315—29 X |
| 2,479,081 | 8/49 | Poch | 315—29 |
| 2,508,879 | 5/50 | Zagor | 315—29 X |
| 2,519,030 | 8/50 | Dome | 328—156 |
| 2,620,441 | 12/52 | McCoy et al. | 328—156 |

OTHER REFERENCES

IRE Dictionary of Electronics Terms and Symbols, Institute of Radio Engineers, New York, 1961; p. 130, TK7804.15.

DAVID G. REDINBAUGH, *Primary Examiner.*

RALPH G. NILSON, *Examiner.*